US012100541B2

(12) United States Patent
Choi et al.

(10) Patent No.: US 12,100,541 B2
(45) Date of Patent: Sep. 24, 2024

(54) EMBEDDED COOLING CHANNEL IN MAGNETICS

(71) Applicant: Intel Corporation, Santa Clara, CA (US)

(72) Inventors: Beomseok Choi, Chandler, AZ (US); Adel A. Elsherbini, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 861 days.

(21) Appl. No.: 17/020,214

(22) Filed: Sep. 14, 2020

(65) Prior Publication Data

US 2022/0084740 A1 Mar. 17, 2022

(51) Int. Cl.
*H01F 27/28* (2006.01)
*H01F 27/10* (2006.01)

(52) U.S. Cl.
CPC ......... *H01F 27/2876* (2013.01); *H01F 27/10* (2013.01)

(58) Field of Classification Search
None
See application file for complete search history.

(56) References Cited

U.S. PATENT DOCUMENTS 3,391,363 A * 7/1968 Moore ................ H01F 27/2876 336/60
3,602,858 A * 8/1971 Moore ................ H01F 27/2876 336/84 R
4,485,289 A * 11/1984 Schwartz ............ H01F 27/2876 336/62
4,577,175 A * 3/1986 Burgher .............. H01F 27/2876 336/62
4,584,551 A * 4/1986 Burgher .............. H01F 27/2876 336/62
4,593,261 A * 6/1986 Forster .................... H01F 27/10 335/299
4,896,130 A * 1/1990 Ermilov ................ H01F 27/322 335/300
5,446,269 A * 8/1995 Peysakhovich ..... H01F 27/2876 336/62
5,514,906 A * 5/1996 Love ..................... H01L 23/473 257/E23.098
5,898,353 A * 4/1999 Cader ..................... H01F 27/10 336/60

(Continued)

FOREIGN PATENT DOCUMENTS

CN 1809903 A * 7/2006 ............. H01F 27/08
DE 102007001233 A1 * 7/2008 ........... H01F 27/306

(Continued)

*Primary Examiner* — Timothy J. Dole
*Assistant Examiner* — Muhammed Azam
(74) *Attorney, Agent, or Firm* — Schwabe, Williamson & Wyatt, P.C.

(57) ABSTRACT

An electronic package comprises, a package substrate, and a magnetic block, where the magnetic block passes through the package substrate. the electronic package further comprises a fluidic path from an inlet to the package substrate to an outlet of the package substrate. The electronic package further comprises a conductive winding in the package substrate, where the conductive winding wraps around the magnetic block, and where the conductive winding is tubular and the fluidic path passes through the conductive winding.

28 Claims, 15 Drawing Sheets

(56) References Cited

U.S. PATENT DOCUMENTS

| | | | | | |
|---|---|---|---|---|---|
| 6,087,583 | A * | 7/2000 | Runge | H01F 27/323 | 174/15.1 |
| 6,253,835 | B1 * | 7/2001 | Chu | F28F 3/12 | 174/15.1 |
| 6,262,503 | B1 * | 7/2001 | Liebman | H01F 27/2876 | 310/58 |
| 6,368,530 | B1 * | 4/2002 | Adubato | F28F 21/062 | 29/605 |
| 6,477,045 | B1 * | 11/2002 | Wang | F28D 15/0233 | 174/15.1 |
| 6,741,152 | B1 * | 5/2004 | Arz | H01F 27/2876 | 336/62 |
| 6,942,018 | B2 * | 9/2005 | Goodson | F28D 15/00 | 174/15.1 |
| 7,023,312 | B1 * | 4/2006 | Lanoue | H01F 41/127 | 336/60 |
| 7,180,292 | B2 * | 2/2007 | Coughlin | G01R 33/3856 | 324/318 |
| 7,212,405 | B2 * | 5/2007 | Prasher | H01L 23/473 | 257/E23.098 |
| 7,215,547 | B2 * | 5/2007 | Chang | H05K 1/0272 | 174/15.1 |
| 7,243,705 | B2 * | 7/2007 | Myers | H01L 23/473 | 257/E23.098 |
| 7,265,979 | B2 * | 9/2007 | Erturk | H05K 7/20363 | 257/713 |
| 7,280,024 | B2 * | 10/2007 | Braunisch | H01F 41/046 | 336/200 |
| 7,289,329 | B2 * | 10/2007 | Chen | H01F 27/2804 | 336/200 |
| 7,370,789 | B2 * | 5/2008 | Ham | G01R 33/385 | 324/318 |
| 7,394,659 | B2 * | 7/2008 | Colgan | H01L 23/42 | 257/713 |
| 7,471,515 | B2 * | 12/2008 | Chang | H01L 23/473 | 257/E23.098 |
| 7,663,460 | B2 * | 2/2010 | Suzuki | H01F 27/324 | 336/200 |
| 8,563,365 | B2 * | 10/2013 | King, Jr. | H01L 24/14 | 257/713 |
| 9,257,229 | B2 * | 2/2016 | Sarver | H01F 41/10 | |
| 10,325,707 | B2 * | 6/2019 | DeNatale | H01F 27/2804 | |
| 10,607,765 | B2 * | 3/2020 | Yoon | H01F 27/2804 | |
| 10,732,241 | B2 * | 8/2020 | Thiagarajan | G01R 33/3858 | |
| 10,770,981 | B2 * | 9/2020 | Hsiao | H01F 27/2804 | |
| 10,912,232 | B2 * | 2/2021 | Nakajima | H02M 7/003 | |
| 11,158,444 | B2 * | 10/2021 | Marin | H01L 23/49838 | |
| 11,432,437 | B2 * | 8/2022 | Takahara | H01F 27/24 | |
| 2004/0070940 | A1 * | 4/2004 | Tomioka | G06F 1/203 | 361/679.48 |
| 2004/0228088 | A1 * | 11/2004 | Minamitani | F28D 15/0266 | 361/679.53 |
| 2006/0042825 | A1 * | 3/2006 | Lu | F28D 15/0266 | 257/E23.09 |
| 2008/0017354 | A1 * | 1/2008 | Neal | H01F 27/10 | 310/43 |
| 2008/0024980 | A1 * | 1/2008 | Suzuki | G06F 1/203 | 361/679.48 |
| 2008/0197953 | A1 * | 8/2008 | Seong | H01F 27/2847 | 336/182 |
| 2009/0065178 | A1 * | 3/2009 | Kasezawa | H01L 23/473 | 165/104.19 |
| 2009/0066453 | A1 * | 3/2009 | Koivuluoma | H01F 27/2876 | 336/60 |
| 2010/0001906 | A1 * | 1/2010 | Akkermans | H01Q 9/0457 | 343/770 |
| 2010/0132923 | A1 * | 6/2010 | Batty | F28D 15/0233 | 165/104.26 |
| 2010/0171213 | A1 * | 7/2010 | Hisano | H01L 23/473 | 257/E23.098 |
| 2013/0206371 | A1 * | 8/2013 | Fujita | F28F 3/12 | 165/104.28 |
| 2013/0220587 | A1 * | 8/2013 | Tamura | F28F 3/022 | 165/185 |
| 2013/0223010 | A1 * | 8/2013 | Shioga | H01L 23/34 | 438/122 |
| 2014/0046248 | A1 * | 2/2014 | Fini | A61M 1/28 | 165/61 |
| 2014/0118946 | A1 * | 5/2014 | Tong | H01F 27/322 | 361/704 |
| 2014/0268572 | A1 * | 9/2014 | Ranjan | H01L 23/427 | 361/700 |
| 2014/0367583 | A1 * | 12/2014 | Barraclough | H01J 37/1472 | 335/297 |
| 2015/0070836 | A1 * | 3/2015 | Yairi | H05K 7/20281 | 361/679.53 |
| 2015/0097644 | A1 * | 4/2015 | Shepard | H01F 41/0206 | 336/60 |
| 2016/0005521 | A1 * | 1/2016 | Pal | H01F 27/2895 | 336/60 |
| 2016/0005524 | A1 * | 1/2016 | Downing | H01F 27/025 | 336/61 |
| 2016/0078993 | A1 * | 3/2016 | Cedell | H01F 27/255 | 336/61 |
| 2016/0118185 | A1 * | 4/2016 | Hirata | H01F 41/127 | 336/198 |
| 2016/0254089 | A1 * | 9/2016 | Parish | H01F 27/2804 | 336/199 |
| 2016/0307685 | A1 * | 10/2016 | White | H01F 27/00 | |
| 2017/0179001 | A1 * | 6/2017 | Brunschwiler | H01L 23/427 | |
| 2017/0301450 | A1 * | 10/2017 | Takahashi | H01F 27/28 | |
| 2018/0342349 | A1 * | 11/2018 | Mao | H01F 27/363 | |
| 2019/0180908 | A1 * | 6/2019 | Metzler | H01F 27/2876 | |
| 2019/0385925 | A1 * | 12/2019 | Walczyk | H01L 23/3677 | |
| 2019/0385932 | A1 * | 12/2019 | Eid | H01L 25/0652 | |
| 2019/0393193 | A1 * | 12/2019 | Eid | H01L 25/0652 | |
| 2020/0006287 | A1 * | 1/2020 | Hill | H01L 23/13 | |
| 2020/0051884 | A1 * | 2/2020 | Shekhar | H01L 23/5227 | |
| 2020/0176174 | A1 * | 6/2020 | Rippel | H01F 27/12 | |
| 2020/0176355 | A1 * | 6/2020 | May | H05K 7/20327 | |
| 2020/0203256 | A1 * | 6/2020 | Neal | H01L 23/49827 | |
| 2020/0273775 | A1 * | 8/2020 | Karhade | F28D 15/02 | |
| 2021/0273524 | A1 * | 9/2021 | Kegeler | H02K 3/24 | |
| 2022/0084736 | A1 * | 3/2022 | Choi | H01L 23/49822 | |
| 2022/0085142 | A1 * | 3/2022 | Choi | H01F 17/0013 | |
| 2022/0093537 | A1 * | 3/2022 | Radhakrishnan | H01F 27/323 | |
| 2022/0328243 | A1 * | 10/2022 | Hino | H01F 27/32 | |
| 2022/0415555 | A1 * | 12/2022 | Dogiamis | H01L 25/0657 | |

FOREIGN PATENT DOCUMENTS

| | | | | |
|---|---|---|---|---|
| WO | WO-0019457 | A1 * | 4/2000 | H01F 27/2876 |
| WO | WO-2011154422 | A1 * | 12/2011 | H01F 27/28 |

* cited by examiner

EMBEDDED COOLING CHANNEL IN MAGNETICS

TECHNICAL FIELD

Embodiments of the present disclosure relate to semiconductor devices, and more particularly to electronic packages with inductors that are cooled by a fluidic channel.

BACKGROUND

As power densities in in-package fabricated magnetics continues to increase, channeling heat out of the magnetics is becoming a bigger challenge. The thermal hot spots of magnetic components are usually at the inner portion of the magnetic design, which makes cooling solutions more challenging. Furthermore, when high permeability magnetic cores are assembled to the package windings, it becomes more difficult to get the heat out from the windings.

In a typical magnetic component for voltage regulation (VR), a two piece magnetic body is assembled around conductive windings in a package substrate to form an inductor. Fringing magnetic fields of the magnetic body lead to heating at the interior portions of the magnetic body that face the windings. When there is no thermal solution to provide cooling to the magnetic body, the thermal limit dictates the form factor and current specifications. Additionally, as higher permeability magnetic materials are used, the hot spots become worse. This limits the ability to use high permeability materials, and thus poses a limit on the minimum power solution size. It is typical to increase the form factor and reduce the power density in order minimize the maximum temperature within the hotspots to satisfy reliability limits. However, this also decreases the quantity of the magnetic components per volume and reduces the maximum power that may be delivered by a given overall power solution size.

EMBODIMENTS OF THE PRESENT DISCLOSURE

Figure 1A:
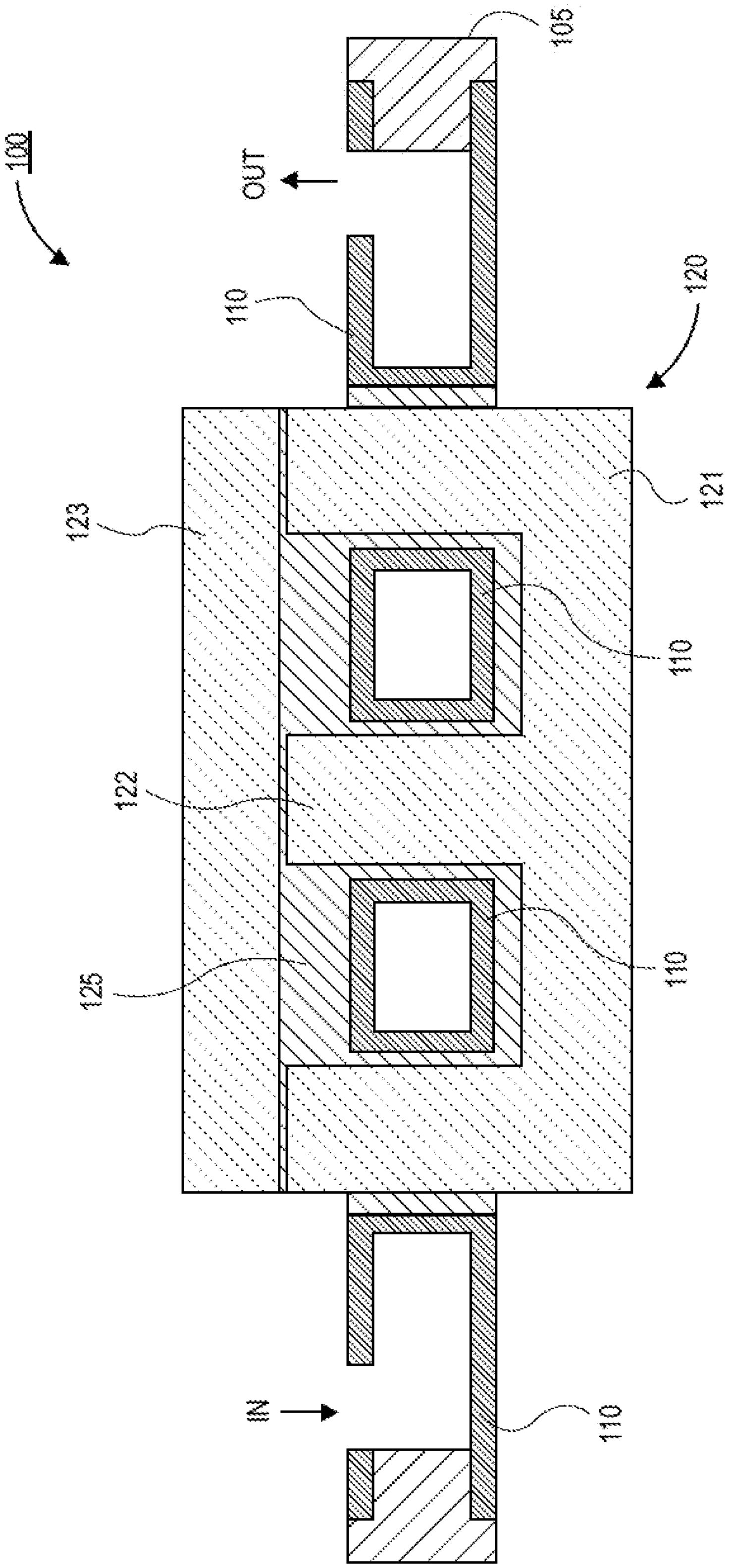
FIG. 1A is a cross-sectional illustration of an electronic package with an inductor that comprises tubular windings to provide a fluidic path for cooling, in accordance with an embodiment.

Described herein are electronic packages with inductors that are cooled by a fluidic channel, in accordance with various embodiments. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

As noted above, cooling of voltage regulator (VR) inductors in electronic packages is challenging. Without a cooling solution, the total power delivered by the inductor is limited. Additionally, advances in material design (e.g., higher magnetic permeability) are not able to be fully leveraged to provide improved performance.

Accordingly, embodiments disclosed herein provide cooling solutions that enable improved VR performance. In one embodiment, the conductive windings are leveraged as a cooling feature. In another embodiment, the magnetic body and the package substrate define a fluidic path that passes through the magnetic body.

In the embodiments where the conductive windings are leveraged as the cooling feature, the conductive windings may have a tubular configuration. The conductive winding tubes are connected to a fluidic inlet and outlet in order to allow for a cooling fluid to pass through the windings. In some embodiments, the entire lateral portion of the fluidic path is implemented in a single conductive winding. As used herein, the "lateral portion of the fluidic path" refers to the portion of a fluidic path that is routed substantially parallel to a top surface of the package substrate. In other embodiments, the lateral portion of the fluidic path may also comprise electrically isolating breaks. Such embodiments allow for a single fluidic path to service inductors that are electrically isolated from each other.

In the embodiments where the magnetic body and the package substrate define a fluidic path, a tube connected to a fluidic inlet/outlet may be inserted in the gap formed between the magnetic body and the package substrate. Separate tubes may be provided for each gap. In other embodiments, a single flexible tube may span multiple gaps.

Referring now to FIG. 1A, a cross-sectional illustration of an electronic package 100 is shown, in accordance with an embodiment. In an embodiment, the electronic package 100 may comprise a package substrate 105. The package substrate 105 may comprise an organic substrate, a ceramic substrate, a glass substrate, or the like. In the particular embodiment illustrated, a single layer of the package substrate 105 is shown. However, it is to be appreciated that a plurality of layers may be laminated together to form the package substrate 105. The package substrate 105 may be cored or coreless.

In an embodiment, a magnetic body 120 is disposed through the package substrate 105. The magnetic body 120 may be a discrete component that is assembled around the package substrate 105. For example, the magnetic body 120 may comprise a base 121 with a plurality of prongs 122 that extend up from the base 121. The plurality of prongs 122 extend through holes in the package substrate 105. A magnetic lid 123 may be coupled to the plurality of prongs 122, e.g., with an epoxy 125 or the like. The epoxy 125 may also fill the remainder of the holes through the package substrate 105. In an embodiment, the epoxy 125 is a thermally conductive epoxy. For example, the epoxy 125 may include conductive filler particles, such as, but not limited to, aluminum.

In an embodiment, the magnetic body 120 may be any suitable magnetic material. In a particular embodiment, the magnetic body 120 may be referred to as a high magnetic permeability material. For example, the magnetic permeability of the magnetic body 120 may be approximately $10\mu/\mu_0$ or greater. Suitable materials for the magnetic body 120 include, but are not limited to, compounds of ferrites, iron, aluminum, cobalt, and nickel.

In an embodiment, a conductive winding 110 is provided around the prongs 122 of the magnetic body 120. Particularly, the conductive winding 110 may be referred to as a "tubular" conductive winding. As used herein, a tubular winding may refer to a section of a winding that provides an enclosed loop in the cross-section transverse to the primary length direction. For example, in FIG. 1A, enclosed loops are illustrated between the prongs 122 as the conductive winding 110 comes into/out of the plane of FIG. 1A. In an embodiment, the cross-section of the tubular sections of the conductive winding 110 may be substantially rectangular, though it is to be appreciated that sidewalls of the conductive winding 110 may not necessarily be perfectly vertical in all embodiments.

In an embodiment, the conductive winding 110 may have an inlet (labeled by the IN arrow) and an outlet (labeled by the OUT arrow). The inlet may receive cooling fluid, and the outlet may return cooling fluid back to a reservoir after it has been used to cool the inductor. The cooling fluid may be any appropriate gas or liquid, or a combination thereof. In one embodiment, the cooling fluid may comprise water. In another embodiment, the cooling fluid may comprise water with additional anti-corrosion additives. In still another embodiment, the cooling fluid may comprise a dielectric refrigerant. In a further embodiment, the heat cooling fluid may comprise an oil. In other embodiments, the cooling fluid may be comprised of two phases (such as liquid water and water vapor, or liquid-phase and gas-phase dielectric refrigerant) that exists simultaneously in one or more regions of the conductive winding 110.

In an embodiment, the inlet and the outlet may be coupled to a source and/or reservoir of cooling fluid that is shared with cooling solutions for other portions of the electronic package (not shown). For example, a system level fluidic cooling solution may provide cooling to one or more dies, or other components in addition to the fluidic path provided by the tubular conductive winding 110.

In the illustrated embodiment, an entire lateral length of the fluidic path from the inlet to the outlet is implemented within the conductive winding 110. That is, the routing of the fluidic path in a plane substantially parallel to the top surface of the package substrate 105 is implemented within the conductive winding 110. As shown in FIG. 1D, some portions of the fluidic path may interface with the package substrate 105, such as proximate to the inlet and the outlet where vertical routing is provided.

Figure 1B:
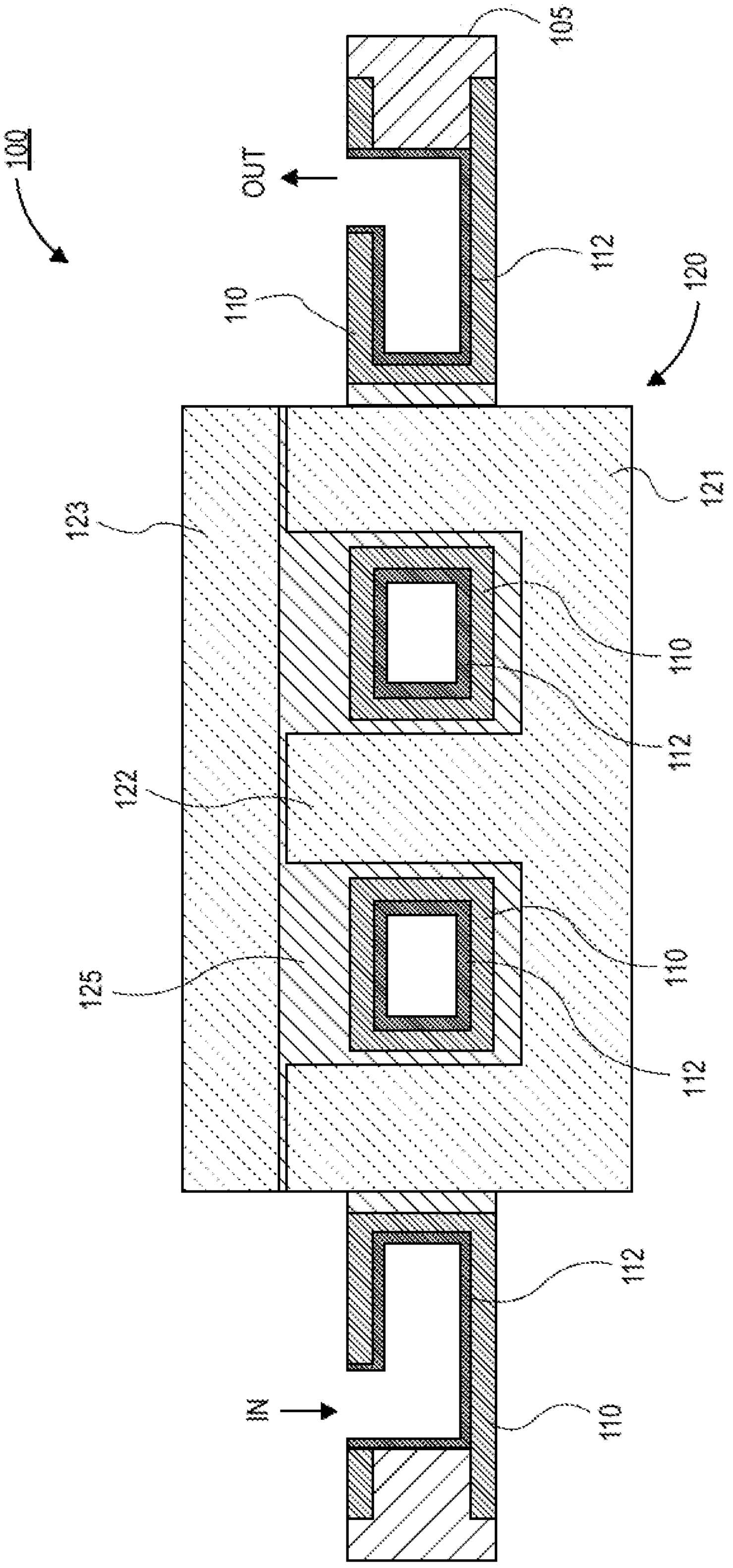
FIG. 1B is a cross-sectional illustration of an electronic package with an inductor that comprises tubular windings with an interior lining to provide a fluidic path for cooling, in accordance with an embodiment.

Referring now to FIG. 1B, a cross-sectional illustration of an electronic package 100 is shown, in accordance with an embodiment. In an embodiment, the electronic package 100 in FIG. 1B may be substantially similar to the electronic package 100 in FIG. 1A, with the exception of there being a liner 112 provided along an interior surface of the tubular conductive winding 110. In an embodiment, the liner 112 may be provided as an additional barrier to prevent loss of the cooling fluid from the interior of the conductive winding 110. The liner 112 may also function to reduce corrosion in the conductive winding 110. For example, the liner 112 may include any appropriate material such as a poly(p-xylylene) polymer, which may be deposited through a wet immersion process, chemical vapor deposition, or physical vapor deposition.

Figure 1C:
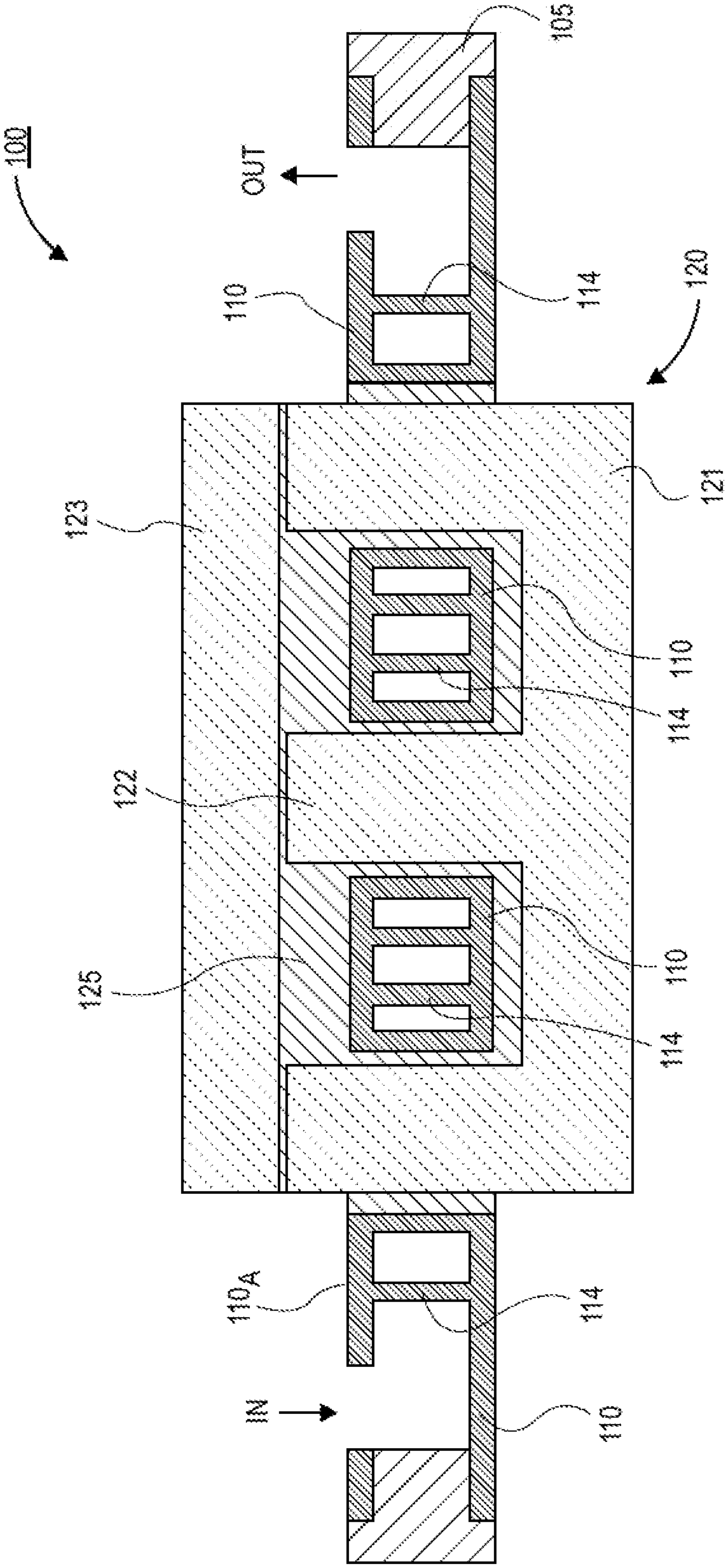
FIG. 1C is a cross-sectional illustration of an electronic package with an inductor that comprises tubular windings with a plurality of support pillars to provide a fluidic path for cooling, in accordance with an embodiment.
Figure 1D:
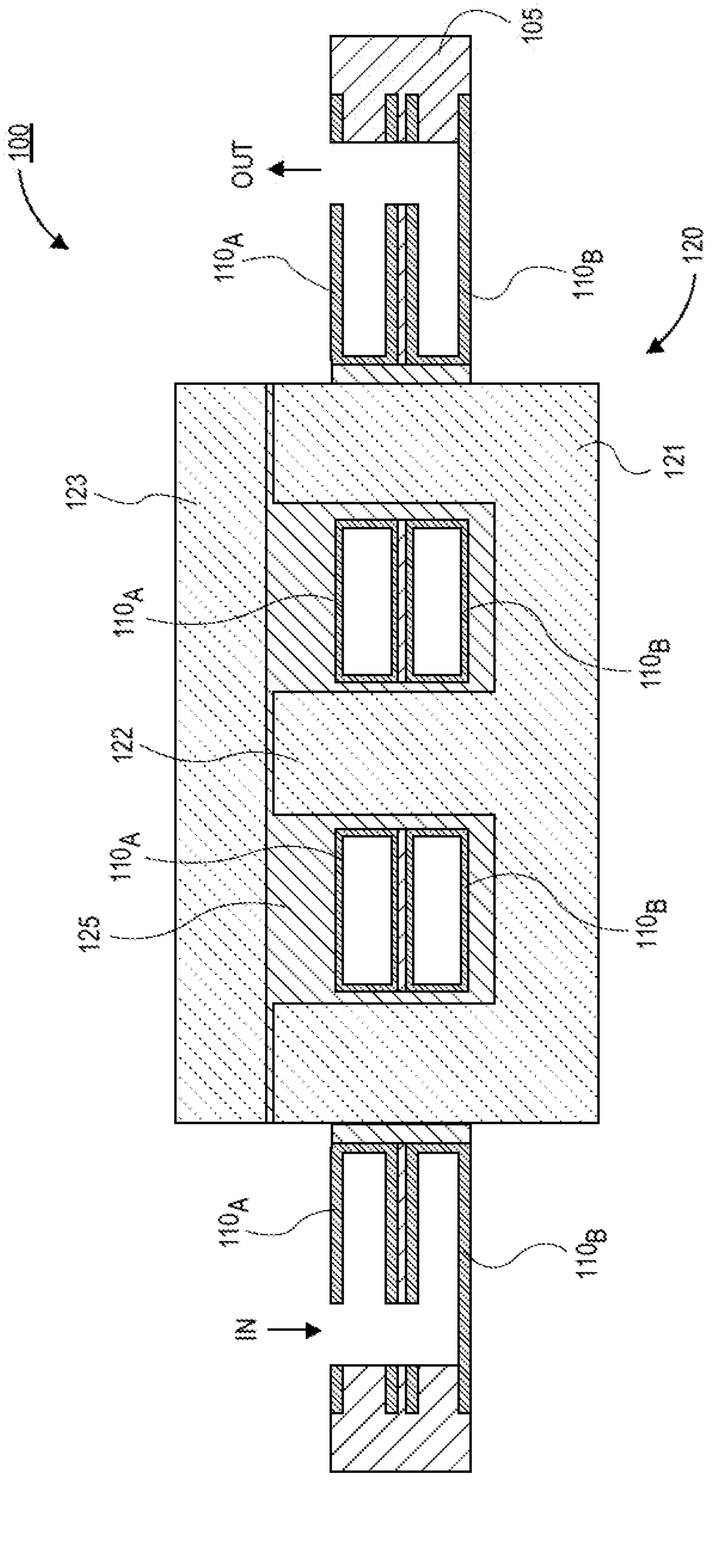
FIG. 1D is a cross-sectional illustration of an electronic package with an inductor that comprises first tubular windings and second tubular windings to provide a fluidic path for cooling, in accordance with an embodiment.

Referring now to FIG. 1C, a cross-sectional illustration of an electronic package 100 is shown, in accordance with an additional embodiment. In an embodiment, the electronic package 100 in FIG. 1C may be substantially similar to the electronic package 100 in FIG. 1A, with the exception of there being a plurality of pillars 114 within the conductive winding 110. The presence of pillars 114 provides structural support for the tubular conductive winding 110. It is to be appreciated that the cooling fluid is free to flow around the pillars 114 (i.e., into and out of the page) so that the flow of the cooling fluid is not substantially obstructed by the presence of the pillars 114. The pillars 114 may be fabricated in parallel with the conductive winding 110 as will be described in greater detail below.

Referring now to FIG. 1D, a cross-sectional illustration of an electronic package 100 is shown, in accordance with an additional embodiment. The electronic package 100 in FIG. 1D may be substantially similar to the electronic package 100 in FIG. 1A, with the exception that there are a plurality of conductive windings 110 provided in multiple layers of the package substrate 105. As shown, a first tubular conductive winding 110A is provided in a first layer of the package substrate 105, and a second tubular conductive winding 110E is provided in a second layer of the package substrate 105. While two tubular conductive windings 110A and 110E are shown, it is to be appreciated that any number of tubular conductive windings 110 may be provided in the package substrate 105. Furthermore, while both conductive windings 110A and 110E are shown as being tubular conductive windings, it is to be appreciated that conductive windings 110 within a single package substrate 105 may include standard conductive windings 110 (i.e., windings that are just a planar trace) and tubular conductive windings 110.

In an embodiment, the first tubular conductive winding 110A and the second tubular conductive winding 110E may be electrically isolated from each other. In other embodiments, the tubular conductive windings 110A and 110E may be electrically coupled to each other. For example, the first tubular conductive winding 110A and the second tubular conductive winding 110E may be electrically coupled in parallel or in series.

In an embodiment, the first tubular conductive winding 110A and the second tubular conductive winding 110E may share a fluid inlet and outlet, as shown in FIG. 1D. However, it is to be appreciated that separate fluid inlets and outlets may be provided for each of the first tubular conductive winding 110A and the second tubular conductive winding 110B.

Referring now to FIGS. 2A-2D, a series of illustrations depicting an electronic package 200 where the lateral routing of the fluidic path is not entirely within a tubular conductive winding is shown, in accordance with additional embodiments.

Figure 2A:
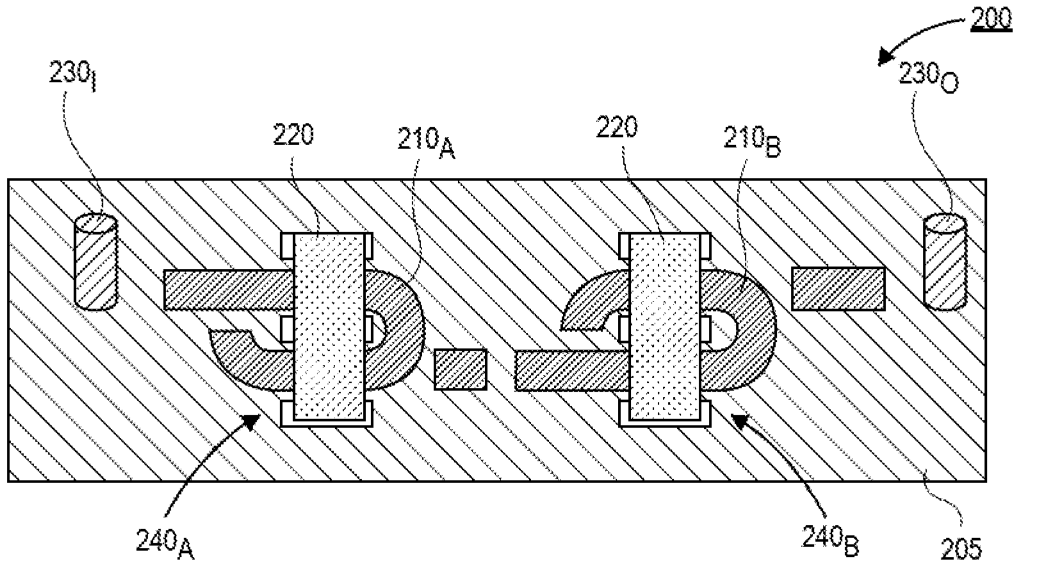
FIG. 2A is a plan view illustration of an electronic package with a pair of inductors that are electrically isolated from each other, but share a fluidic path for cooling, in accordance with an embodiment.

Referring now to FIG. 2A, a plan view illustration of an electronic package 200 is shown, in accordance with an embodiment. The electronic package 200 comprises a package substrate 205. The package substrate 205 may be a cored or coreless package substrate. In some embodiments, the package substrate 205 may comprise an organic material, a ceramic material, or a glass material.

In an embodiment, a pair of inductors $\mathbf{240}_A$ and $\mathbf{240}_B$ are provided on the package substrate 205. Each of the inductors $\mathbf{240}_A$ and $\mathbf{240}_B$ may comprise a magnetic body 220 that passes through the package substrate 205, and a conductive winding $\mathbf{210}_A$ or $\mathbf{210}_B$ that wraps around prongs of the magnetic body 220. As illustrated in FIG. 2A, the inductors $\mathbf{240}_A$ and $\mathbf{240}_B$ are electrically isolated from each other by portions of the package substrate 205. Despite being decoupled from each other, conductive windings $\mathbf{210}_A$ and $\mathbf{210}_B$ may be part of a single fluidic path from an inlet $\mathbf{230}_I$ to an outlet $\mathbf{230}_O$, as will be described in greater detail below. In an embodiment, the magnetic bodies 220 may be substantially similar to the magnetic bodies 120 described in greater detail above. In an embodiment, the conductive windings $\mathbf{210}_A$ and $\mathbf{210}_B$ may be substantially similar in structure to the conductive windings 110 described in greater detail above.

Figure 2B:
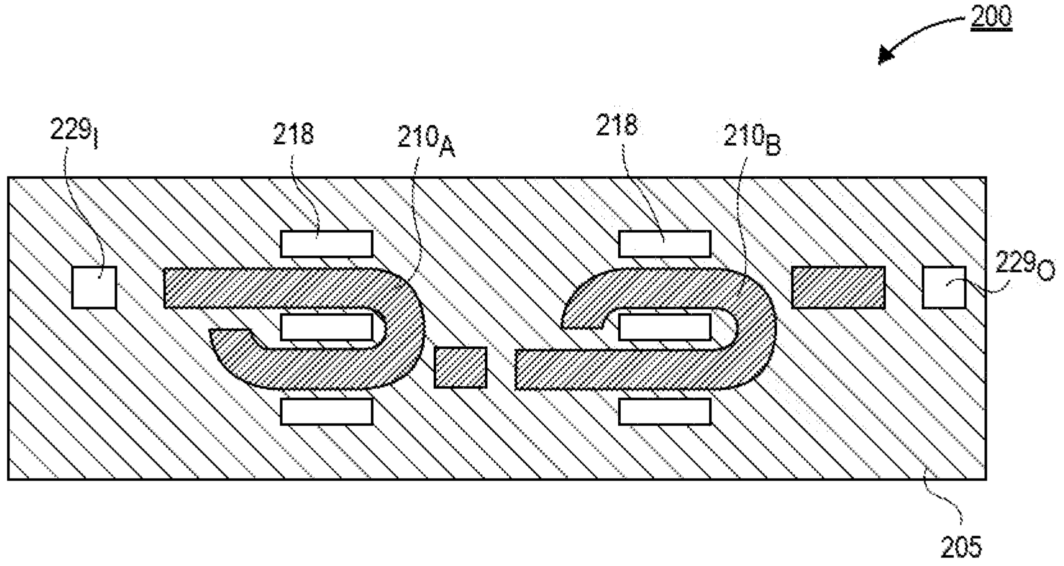
FIG. 2B is a plan view illustration of the electronic package in FIG. 2A with the magnetic bodies and inlet/outlet stems omitted, in accordance with an embodiment.

Referring now to FIG. 2B, a plan view illustration of the electronic package 200 is shown, in accordance with an embodiment. The illustration in FIG. 2B omits the inlet $\mathbf{230}_I$, the outlet $\mathbf{230}_O$, and the magnetic bodies 220 to more clearly show the structure of the conductive windings $\mathbf{210}_A$ and $\mathbf{210}_B$. Removal of the magnetic bodies 220 shows the presence of a set of through substrate openings 218. For example, three openings 218 are provided for each of the magnetic bodies 220. The conductive windings $\mathbf{210}_A$ and $\mathbf{210}_B$ each wrap around a set of the openings 218. Also shown in FIG. 2B is the openings 2291 and 2290 to provide vertical connections between the tubular conductive windings $\mathbf{210}_A$ and $\mathbf{210}_B$ and the inlet $\mathbf{230}_I$ and the outlet $\mathbf{230}_O$.

Figure 2C:
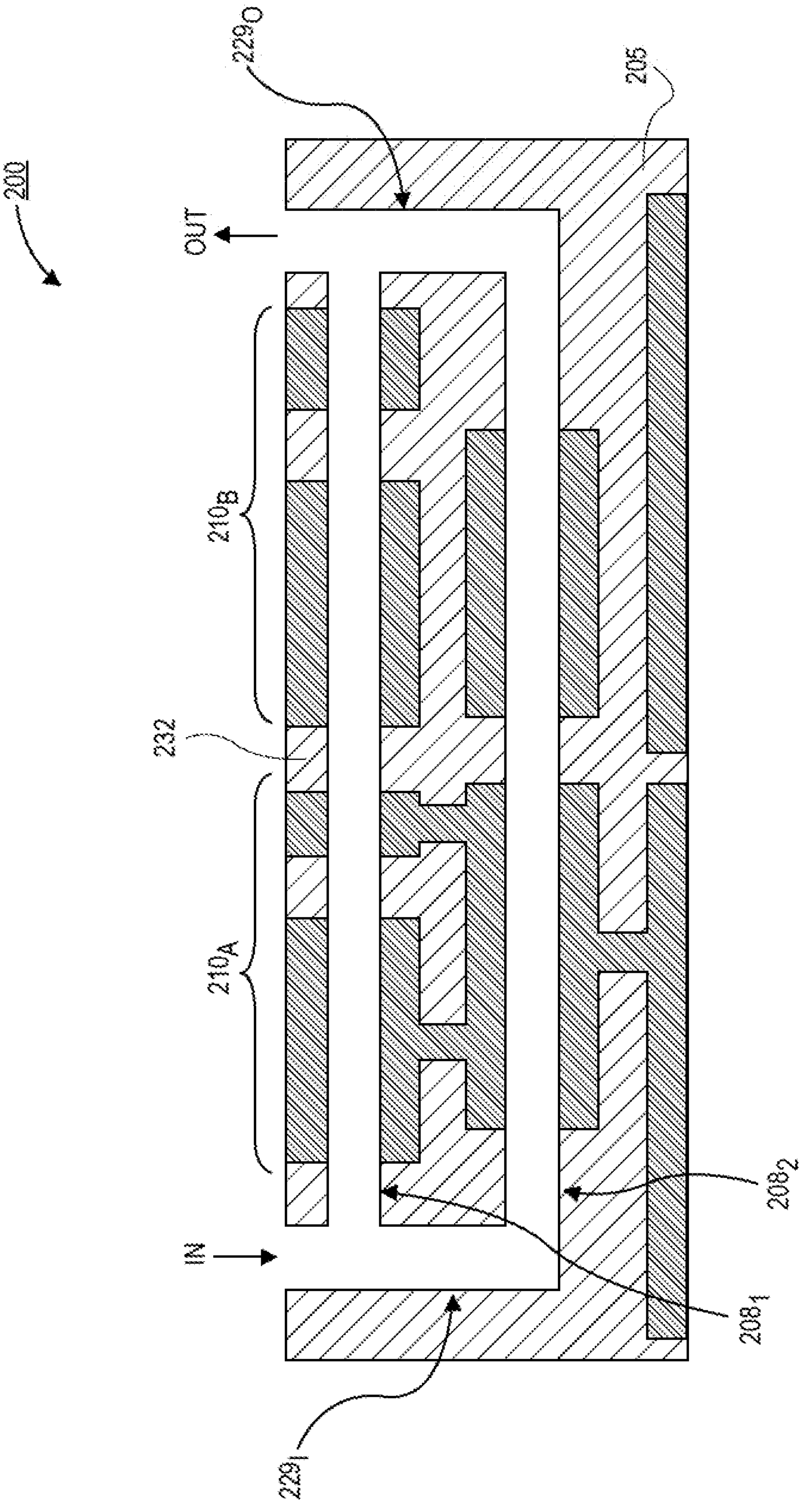
FIG. 2C is a cross-sectional illustration of an electronic package that comprises a pair of inductors that are electrically isolated from each other, but share a single fluidic path for cooling, in accordance with an embodiment.

Referring now to FIG. 2C, a cross-sectional illustration of an electronic package 200 is shown in accordance with an additional embodiment. The cross-section in FIG. 2C is not a cross-section of FIG. 2A or 2B, but is illustrative of the how the fluidic paths correspond to the tubular conductive windings $\mathbf{210}_A$ and $\mathbf{210}_B$. In the embodiment illustrated in FIG. 2C, the conductive windings $\mathbf{210}_A$ and $\mathbf{210}_B$ each comprise a top winding and a bottom winding. However, it is to be appreciated that any number of layers of conductive windings may be provided in accordance with various embodiments.

As illustrated in FIG. 2C, the first conductive windings $\mathbf{210}_A$ are electrically isolated from the second conductive windings $\mathbf{210}_B$ by a portion 232 of the package substrate 205. However, despite not being physically connected to each other, the first conductive windings $\mathbf{210}_A$ and the second conductive windings $\mathbf{210}_B$ are both used to provide the fluidic paths 208. In the illustrated embodiment, a fluidic path 208 is provided in each layer. The first fluidic path $\mathbf{208}_1$ is in a top layer, and a second fluidic path $\mathbf{208}_2$ is in a bottom layer. As shown, the fluidic paths 208 connect the inlet opening $\mathbf{229}_I$ to the outlet opening $\mathbf{229}_O$. Additionally, the lateral routing of the fluidic paths 208 are not entirely within the tubular conductive windings $\mathbf{210}_A$ and $\mathbf{210}_B$. For example, a portion of the fluidic paths 208 may pass through the portion 232 of the package substrate 205. Therefore, a single fluidic path 208 may provide cooling to two electrically isolated inductors.

Figure 2D:
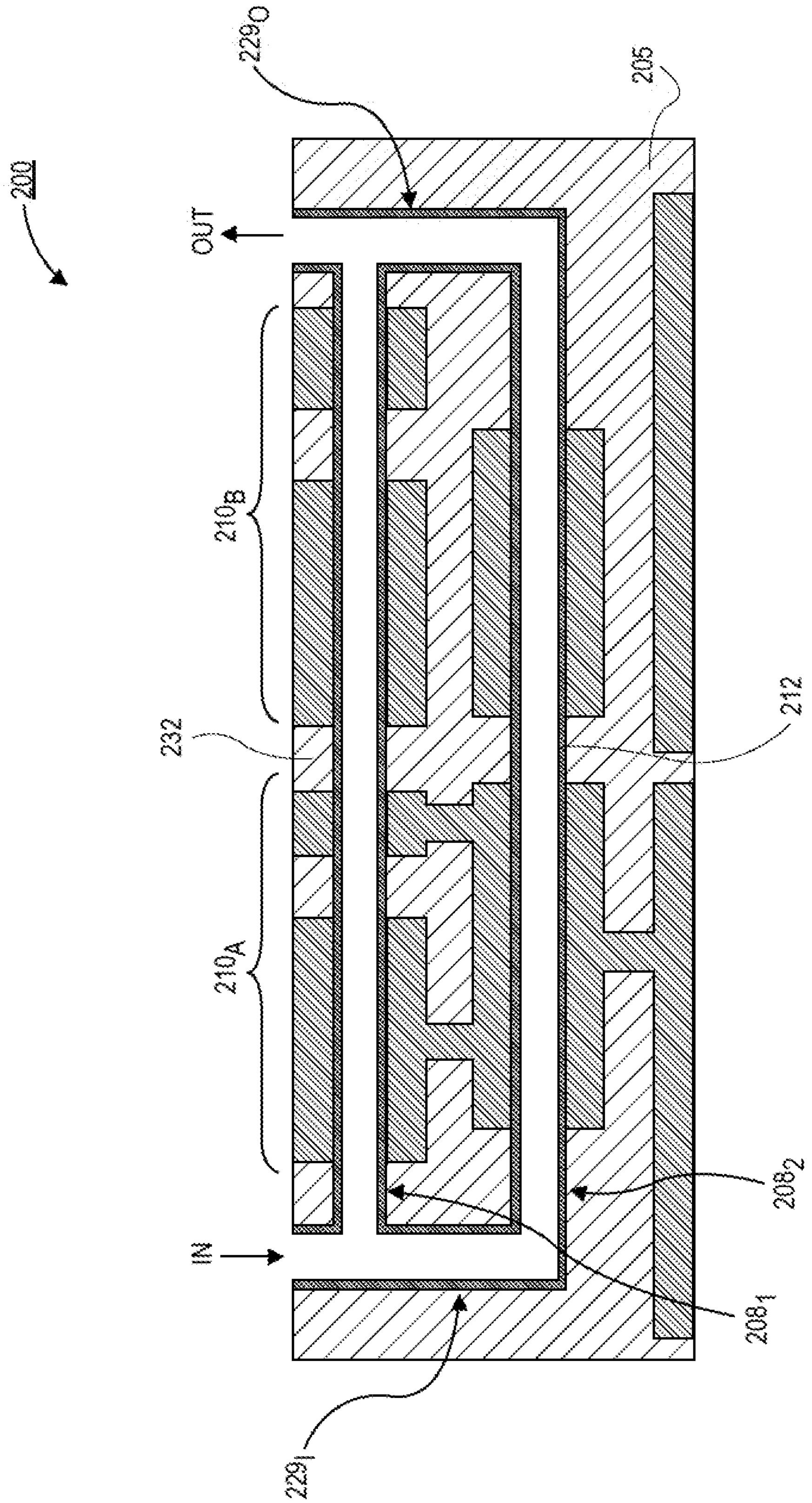
FIG. 2D is a cross-sectional illustration of an electronic package that comprises a pair of inductors that are electrically isolated from each other, but share a single fluidic path for cooling that is lined by a liner, in accordance with an embodiment.

Referring now to FIG. 2D, a cross-sectional illustration of an electronic package 200 is shown, in accordance with an additional embodiment. The electronic package 200 in FIG. 2D may be substantially similar to the electronic package 200 in FIG. 2C, with the exception that a liner 212 is provided along the fluidic path 208. In an embodiment, the presence of the liner 212 may improve corrosion resistance of the conductive windings $\mathbf{210}_A$ and $\mathbf{210}_B$. Additionally, the liner 212 may provide improved protection to the portions 232 of the package substrate 205 that are exposed along the fluidic path 208 in order to limit or eliminate leakage of the cooling fluid from the fluidic path 208. For example, the liner 212 may include any appropriate material such as a poly(p-xylylene) polymer, which may be deposited through a wet immersion process, chemical vapor deposition, or physical vapor deposition.

Referring now to FIGS. 3A-3G a series of illustrations depicting a process for forming a tubular conductive winding is shown, in accordance with an embodiment.

Figure 3A:
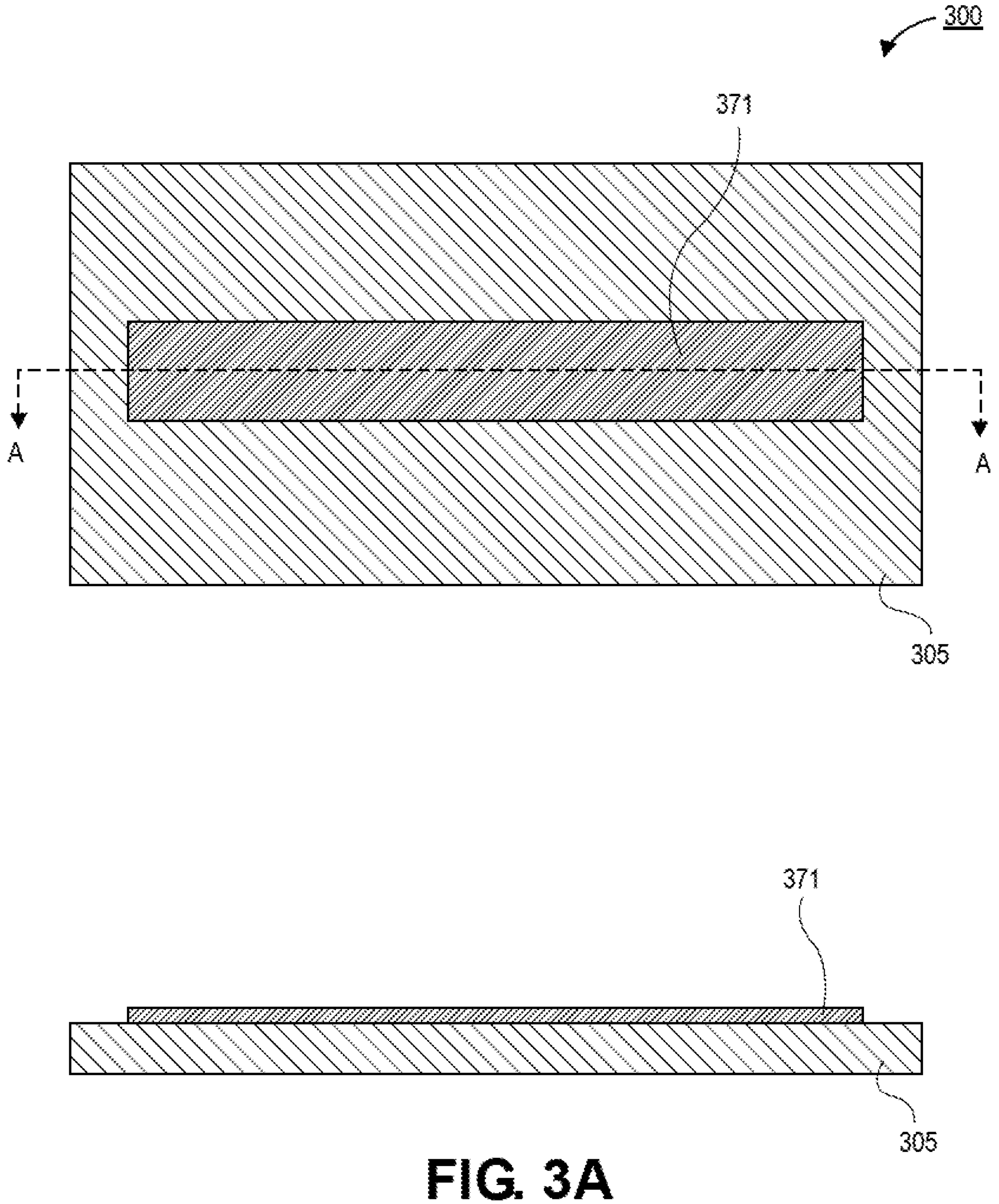
FIGS. 3A-3G are illustrations depicting a process for forming tubular conductive windings for use in actively cooled inductors or transformers, in accordance with an embodiment.

Referring now to FIG. 3A, a plan view illustration and a corresponding cross-sectional illustration (using A-A line) of an electronic package 300 at a stage of manufacture is shown, in accordance with an embodiment. As shown, the electronic package 300 comprises a package substrate 305. A bottom trace 371 is provided on the package substrate 305. For example, the bottom trace 371 may be formed with a suitable deposition and/or patterning process. In an embodiment, the bottom trace 371 comprises copper or another conductive material.

Figure 3B:
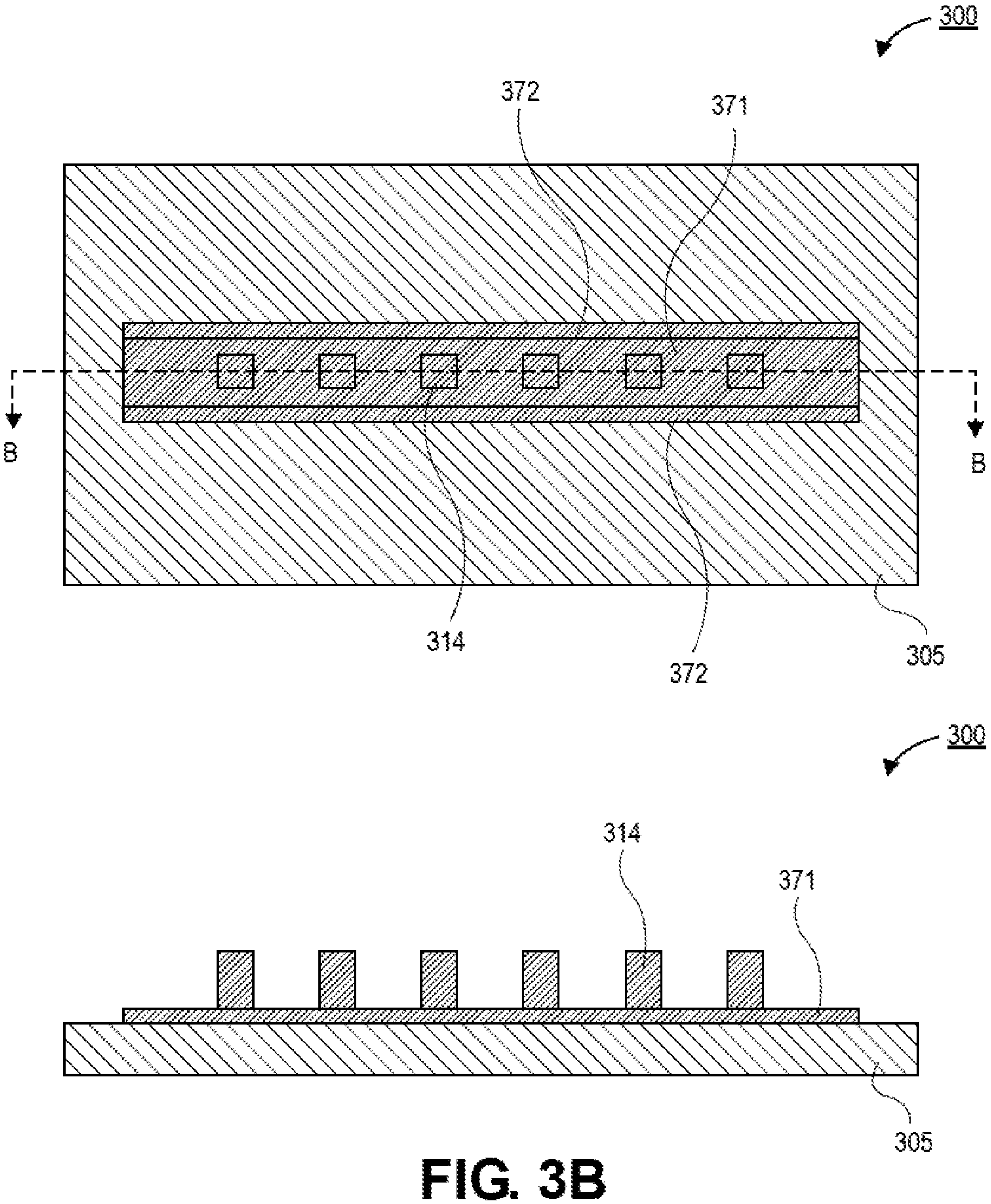

Referring now to FIG. 3B, a plan view illustration and a corresponding cross-sectional illustration (using B-B line) of the electronic package 300 after sidewalls 372 and pillars 314 are formed is shown, in accordance with an embodiment. The sidewalls 372 may be provided along edges of the bottom trace 371, and the pillars 314 may be provided between the pair of sidewalls 372. The sidewalls 372 and the pillars 314 may be formed with any suitable process. In a particular embodiment, the sidewalls 372 and the pillars 314 may be formed with a lithographic via formation process. As such, line vias are able to be formed in order to form sidewalls 372 substantially along an entire length of the bottom trace 371. In an embodiment, the pillars 314 provide additional mechanical support for a subsequently deposited top trace. In some embodiments, the pillars 314 may be omitted. The sidewalls 372 and the pillars 314 may comprise copper or another suitable conductive material.

Figure 3C:
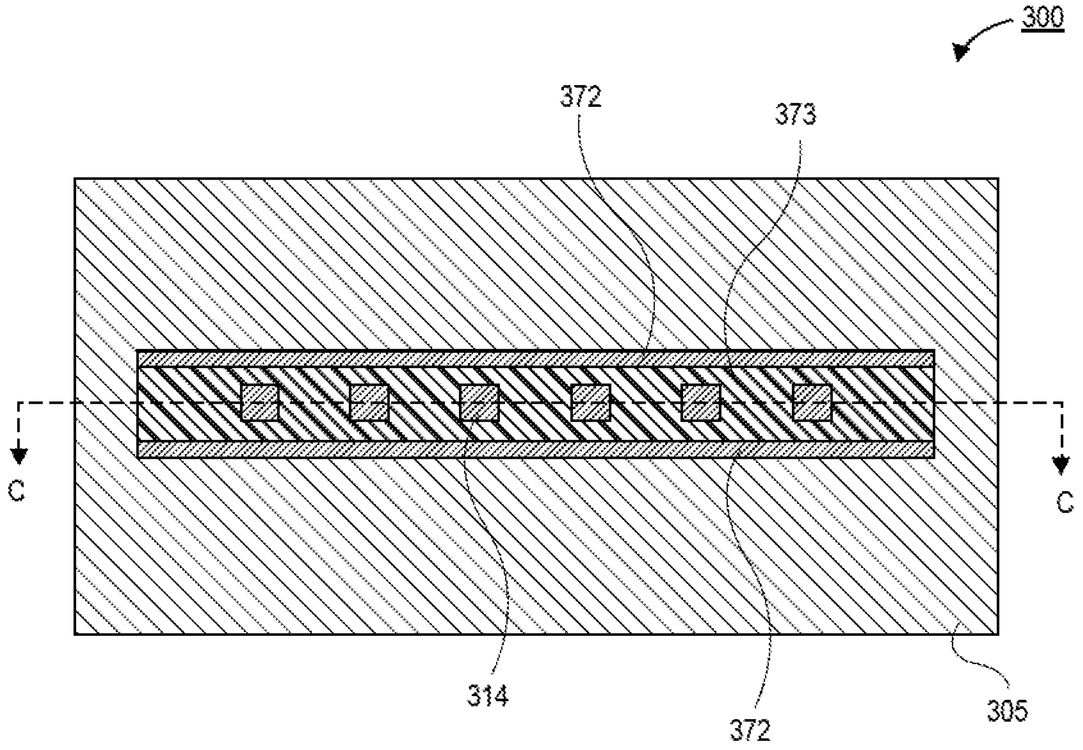
Figure 3C:
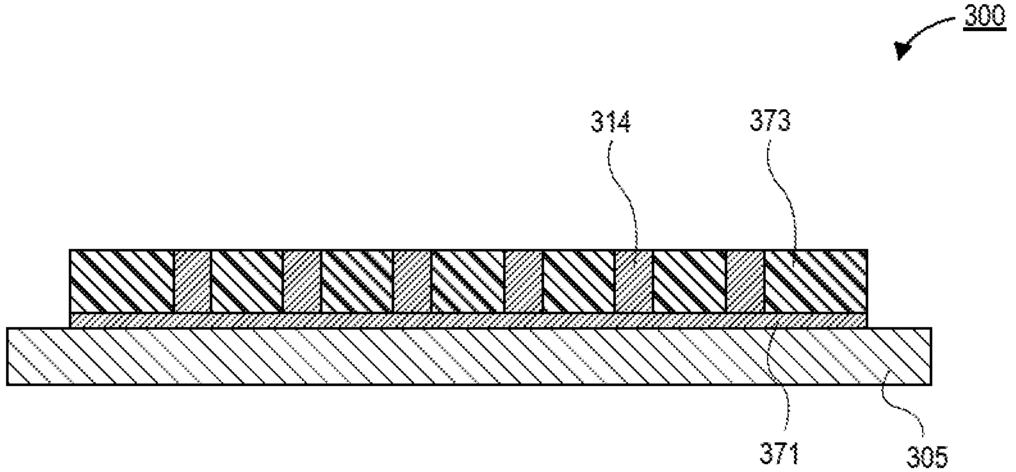

Referring now to FIG. 3C, a plan view illustration and a corresponding cross-sectional illustration (using C-C line) of the electronic package 300 after a sacrificial layer 373 is disposed between the sidewalls 372 is shown, in accordance with an embodiment. The sacrificial layer 373 is used as a scaffolding layer onto which the top trace will be deposited. In an embodiment, the sacrificial layer 373 comprises a material that is easily removed, (e.g., with an etching process, or a vaporization process).

Figure 3D:
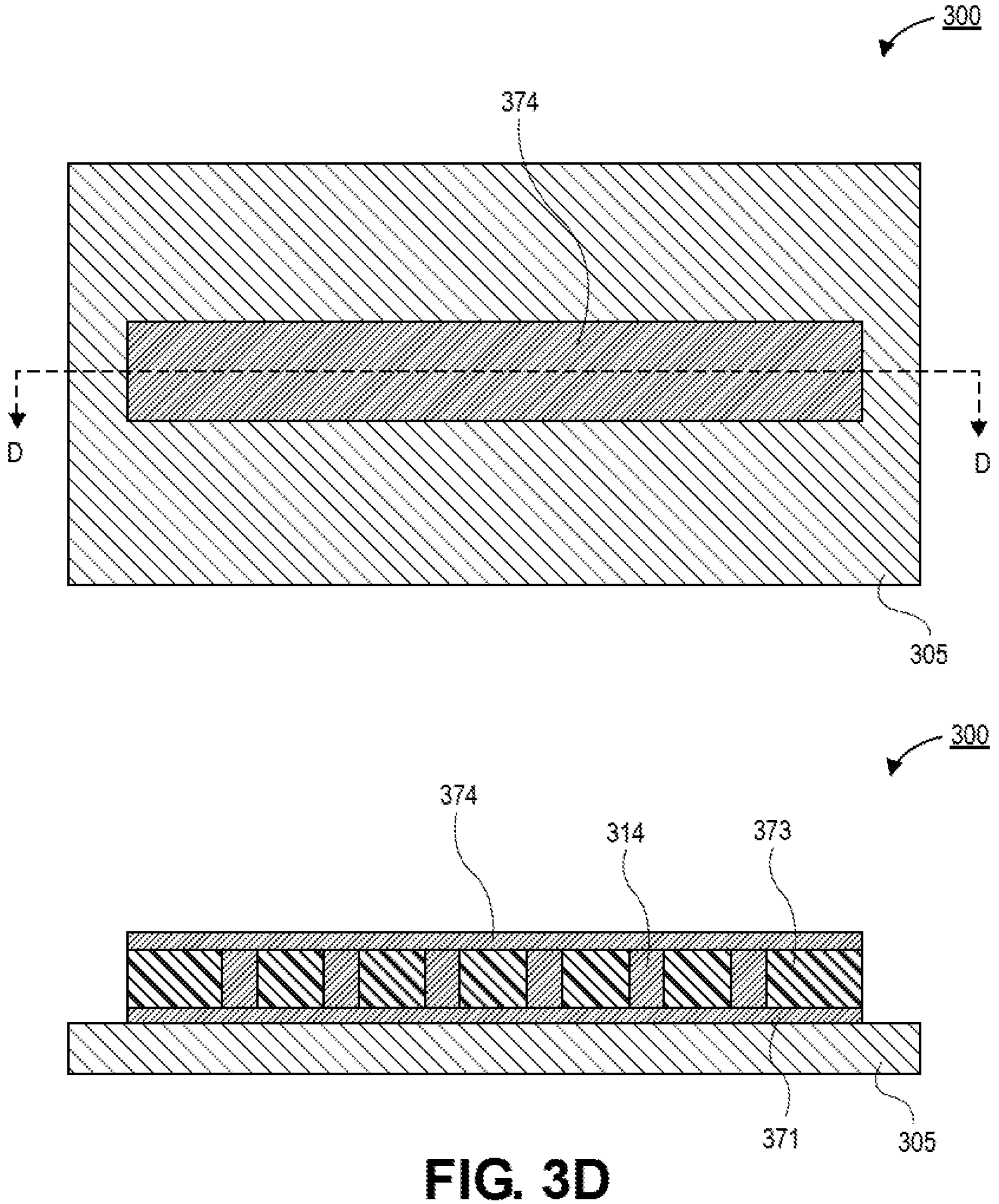

Referring now to FIG. 3D, a plan view illustration and a corresponding cross-sectional illustration (using D-D line) of the electronic package 300 after the top trace 374 is disposed over the sidewalls 372 and the sacrificial layer 373 is shown, in accordance with an embodiment. In an embodiment, the footprint of the top trace 374 may substantially match the footprint of the bottom trace 371 in some embodiments. The top trace 374 may comprise copper or another suitable conductive material. The top trace 374 may be formed with a lithographic process or any other suitable deposition and patterning process.

Figure 3E:
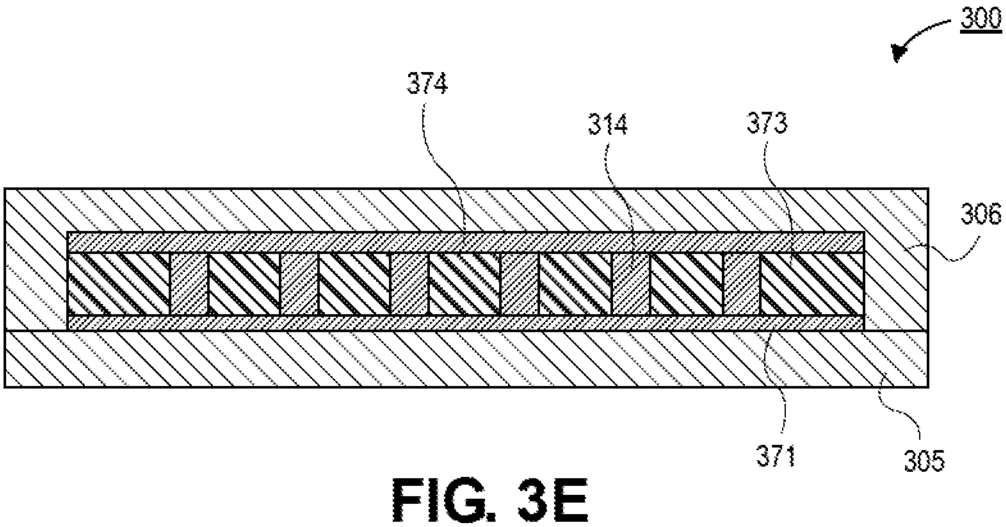

Referring now to FIG. 3E, a cross-sectional illustration of the electronic package 300 after a second package substrate layer 306 is disposed over the exposed surfaces is shown, in accordance with an embodiment. In an embodiment, the second package substrate layer 306 may be deposited with a lamination process or any other suitable process.

Figure 3F:
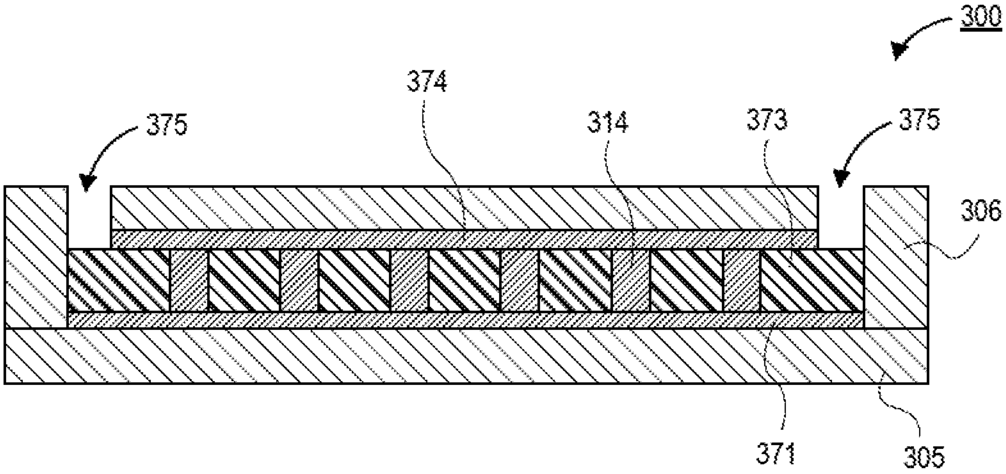

Referring now to FIG. 3F, a cross-sectional illustration of the electronic package 300 after openings 375 are formed through the second package substrate layer 306 is shown, in accordance with an embodiment. In an embodiment, the openings 375 also pass through the top trace 374 to expose portions of the sacrificial layer 373. In an embodiment, the openings 375 may be formed with an etching process or a laser drilling process.

Figure 3G:
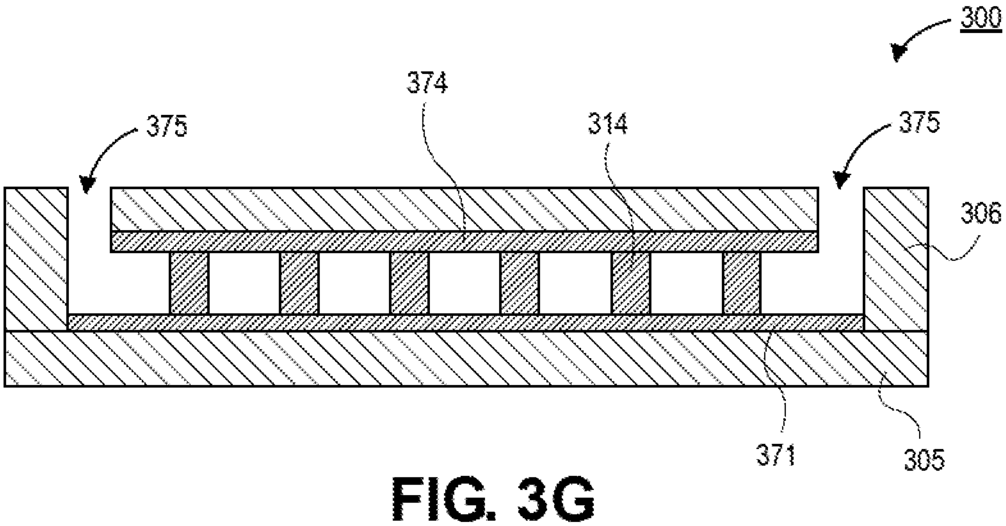

Referring now to FIG. 3G, a cross-sectional illustration of the electronic package 300 after the sacrificial layer 373 is removed is shown, in accordance with an embodiment. Removal of the sacrificial layer 373 may be done with an etching process or a vaporization process. After removal of the sacrificial layer 373 a tubular winding (which comprises the bottom trace 371, the sidewalls 372, and the top trace 374) is provided between the openings 375 on either end. In the illustrated embodiment, the fluidic path between the openings 375 is entirely within the conductive winding. However, it is to be appreciated that in some embodiments, the fluidic path may comprise portions that pass over the package substrate, and which are not surrounded by the conductive winding, as shown in FIG. 2C.

In FIGS. 1A-3G, the tubular conductive windings are described with respect to the formation of inductors. However, it is to be appreciated that substantially similar architectures may be used to provide actively cooled transformers. For example, the primary winding and the secondary winding of the transformer may comprise tubular conductive windings.

In FIGS. 1A-3G, the thermal control feature is provided within conductive windings. However, embodiments are not limited to such embodiments. For example, channels for cooling may also be provided in a gap between the magnetic body and the package substrate. Examples of such embodiments are shown in FIGS. 4A and 4B.

Figure 4A:
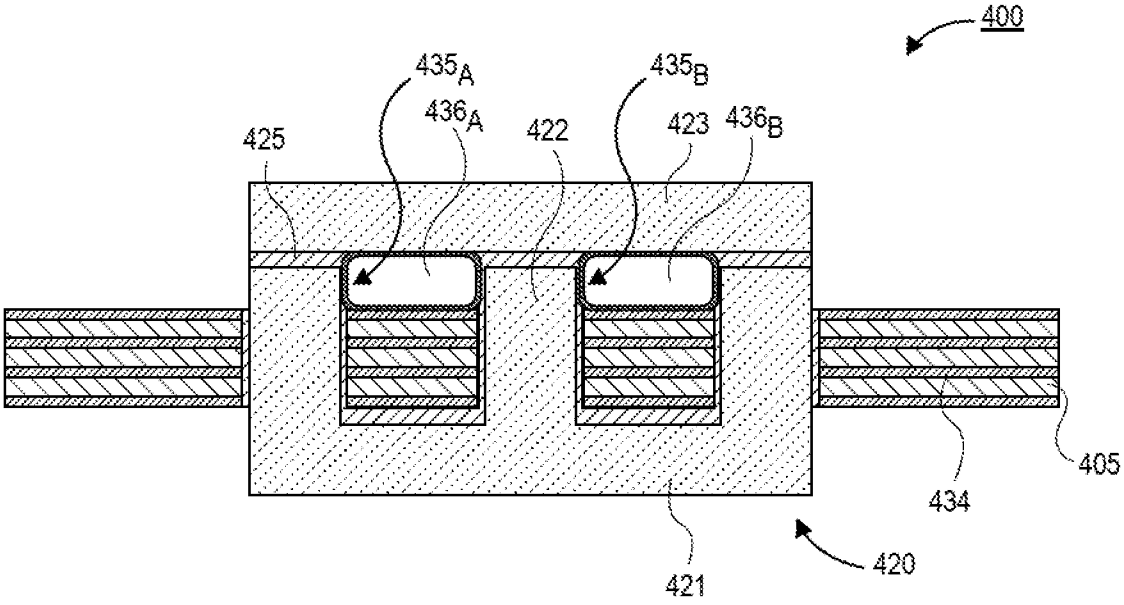
FIG. 4A is a cross-sectional illustration of an electronic package that comprises a magnetic body surrounded by conductive windings, where a fluidic path is provided above the package substrate, in accordance with an embodiment.
Figure 4B:
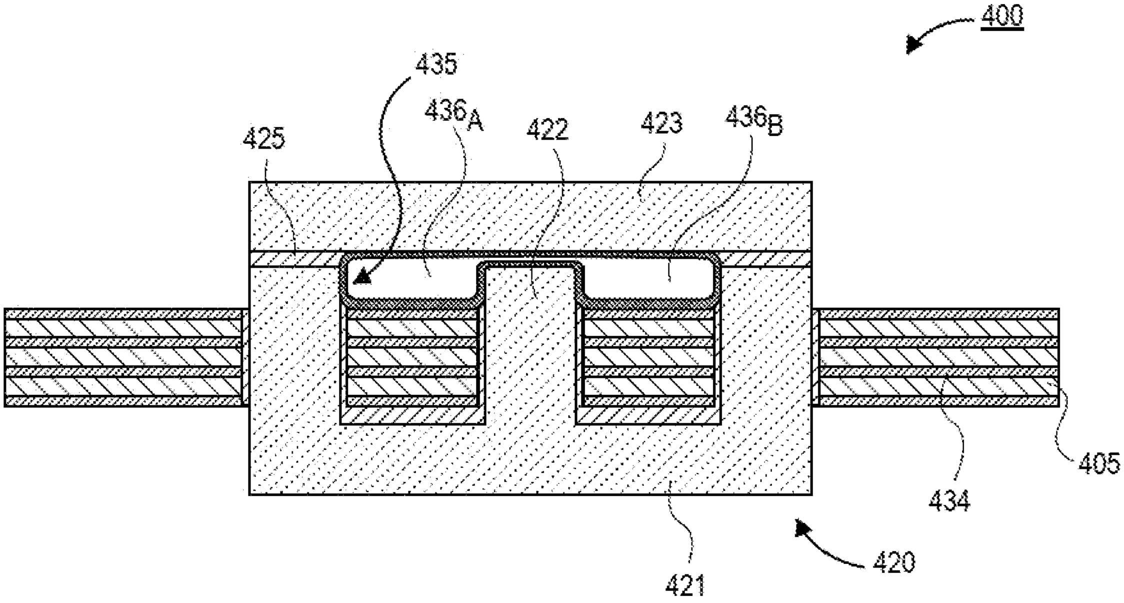
FIG. 4B is a cross-sectional illustration of an electronic package that comprises a magnetic body surrounded by conductive windings, where a single tube provides fluidic paths between two prongs of the magnetic body, in accordance with an embodiment.

Referring now to FIG. 4A, a cross-sectional illustration of an electronic package 400 is shown, in accordance with an embodiment. The electronic package 400 may comprise a package substrate 405. Conductive windings 434 may be provided in the electronic package 400. In an embodiment, the conductive windings 434 may include conductive traces. That is, the conductive windings 434 may not be tubular in some embodiments.

In an embodiment, a magnetic body 420 is disposed through the package substrate 405. The magnetic body 420 may comprise a base 421 with a plurality of prongs 422 extending up from the base 421. The prongs 422 may be the portion of the magnetic body 420 that passes through the package substrate 405. In an embodiment, a magnetic lid 423 is disposed over the ends of the prongs 422. The magnetic lid 423 may be secured to the prongs 422 by a thermally conductive adhesive 425.

In an embodiment, the prongs 422 extend up above a top surface of the package substrate 405. As such gaps 436 are provided between a top surface of the package substrate 405 and a bottom surface of the magnetic lid 423. For example, a first gap $\mathbf{436}_A$ and a second gap $\mathbf{436}_B$ are provided in FIG. 4A. In an embodiment, the gaps 436 may be locations where a cooling fluid is provided through the inductor in order to cool the magnetic body 420.

In a particular embodiment, the gaps $\mathbf{436}_A$ and $\mathbf{436}_B$ may house tubes 435. For example, a first tube $\mathbf{435}_A$ is included in gap $\mathbf{436}_A$, and a second tube $\mathbf{435}_B$ is included in the gap $\mathbf{436}_B$. The tubes 435 may be fluidically coupled to a source/reservoir of cooling fluid, such as water, a dielectric refrigerant, oil, etc.

Referring now to FIG. 4B, a cross-sectional illustration of an electronic package 400 is shown, in accordance with an additional embodiment. In an embodiment, the electronic package 400 in FIG. 4B may be substantially similar to the electronic package 400 in FIG. 4A, with the exception that a single tube 435 is used to provide cooling in both the first gap $\mathbf{436}_A$ and the second gap $\mathbf{436}_B$. The single tube 435 may extend across a middle prong 422 in order to be present in both gaps 436. At locations across the middle prong 422, the tube 435 may be pinched. That is, an interior dimension of the tube 435 over the middle prong 422 may be smaller than an interior dimension in the first gap $\mathbf{436}_A$ and the second gap $\mathbf{436}_B$. In some embodiments, the tube 435 is pinched completely closed across the middle prong 422. In other embodiments, a small air gap is formed in the tube 435 across the middle prong 422.

In FIGS. 4A and 4B, the cooling channels are described with respect to the formation of inductors. However, it is to be appreciated that substantially similar architectures may be used to provide actively cooled transformers. For example, instead of a single winding, a primary winding and a secondary winding may wrap around the prongs of the magnetic body 420.

Figure 5:
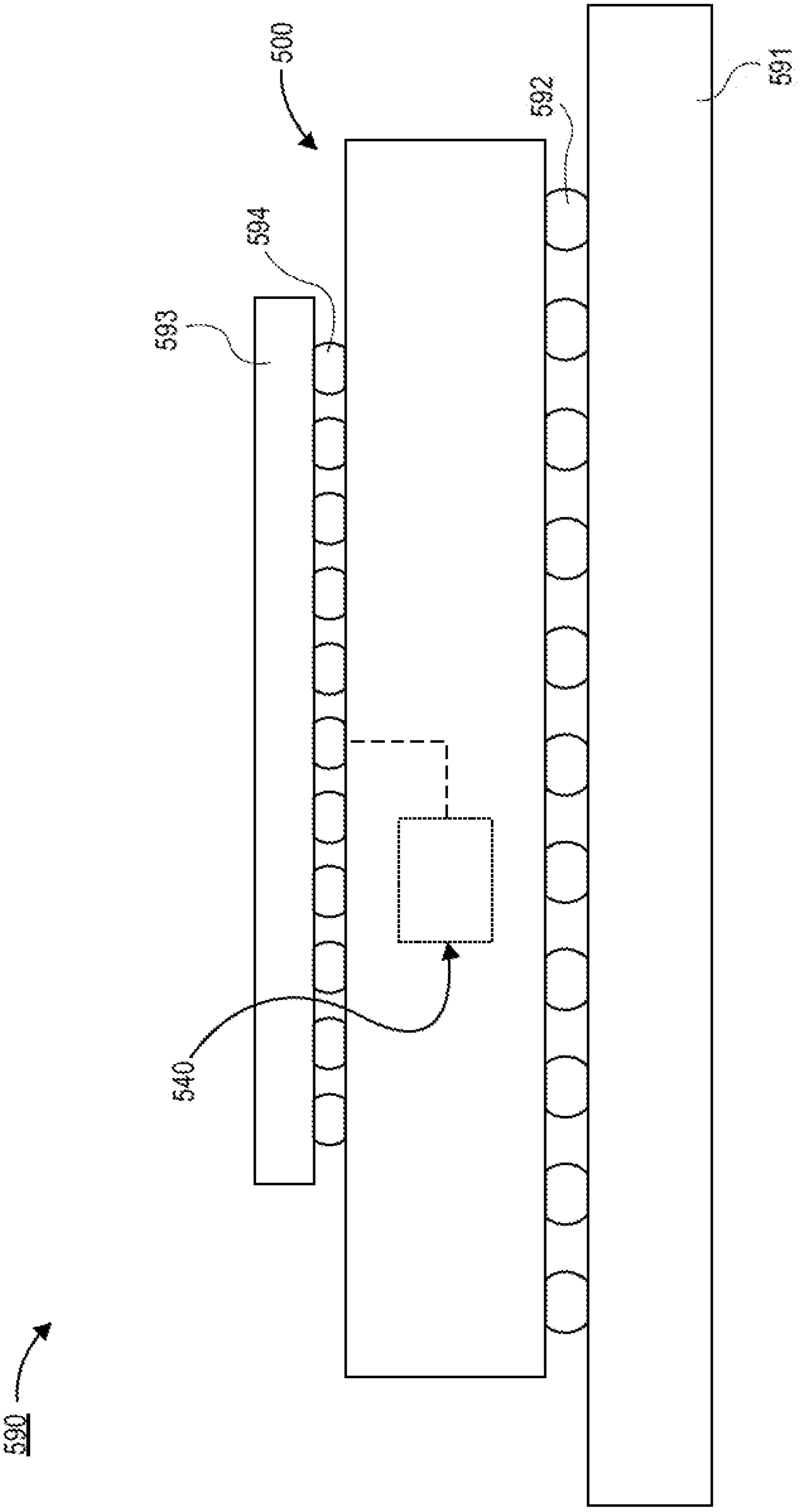
FIG. 5 is a cross-sectional illustration of an electronic system with an inductor that comprises a fluidic path for cooling, in accordance with an embodiment.

Referring now to FIG. 5, a cross-sectional illustration of an electronic system 590 is shown, in accordance with an embodiment. In an embodiment, the electronic system 590 may comprise a board 591, such as a printed circuit board (PCB), a motherboard, or the like. In an embodiment, an electronic package 500 is coupled to the board 591 by interconnects 592. The interconnects 592 may be solder balls, sockets, or any other suitable interconnect architecture. In an embodiment, a die 593 is electrically coupled to the electronic package 500 by interconnects 594. The interconnects 594 may be any suitable first level interconnects (FLIs).

In an embodiment, the electronic package 500 may be substantially similar to any of the electronic packages described above. Particularly, the electronic package 500 may comprise one or more inductors or transformers 540 that are actively cooled. For example, the cooling may be implemented by tubular conductive windings, similar to the embodiments shown in FIGS. 1A-3G. Embodiments may also include inductors or transformers 540 that are cooled by fluidic channels or gaps between a bottom surface of a magnetic lid and a top surface of the package substrate, similar to the embodiments shown in FIGS. 4A and 4B.

Figure 6:
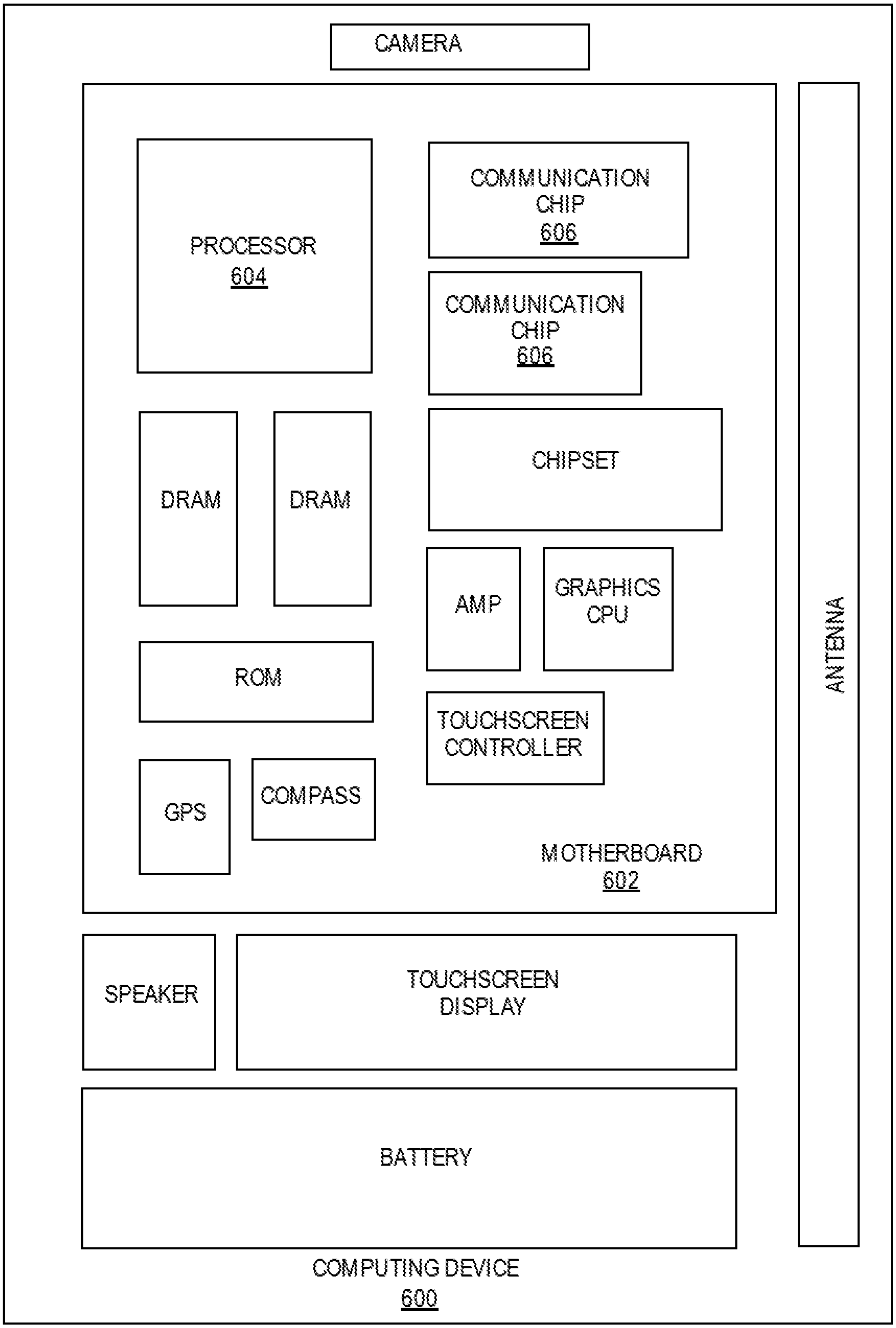
FIG. 6 is a schematic of a computing device built in accordance with an embodiment.

FIG. 6 illustrates a computing device 600 in accordance with one implementation of the invention. The computing device 600 houses a board 602. The board 602 may include a number of components, including but not limited to a processor 604 and at least one communication chip 606. The processor 604 is physically and electrically coupled to the board 602. In some implementations the at least one communication chip 606 is also physically and electrically coupled to the board 602. In further implementations, the communication chip 606 is part of the processor 604.

These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 606 enables wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth™, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth™ and a second communication chip 606 may be dedicated to longer range wireless communications such as GPS, EDGE, GPRS, CDMA, WiMAX, LTE, Ev-DO, and others.

The processor 604 of the computing device 600 includes an integrated circuit die packaged within the processor 604. In some implementations of the invention, the integrated circuit die of the processor may be coupled to an electronic package that comprises an inductor that is actively cooled by a fluidic path within tubular conductive windings and/or between the magnetic lid and the package substrate, in accordance with embodiments described herein. The term "processor" may refer to any device or portion of a device that processes electronic data from registers and/or memory to transform that electronic data into other electronic data that may be stored in registers and/or memory.

The communication chip 606 also includes an integrated circuit die packaged within the communication chip 606. In accordance with another implementation of the invention, the integrated circuit die of the communication chip may be coupled to an electronic package that comprises an inductor that is actively cooled by a fluidic path within tubular conductive windings and/or between the magnetic lid and the package substrate, in accordance with embodiments described herein.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Example 1: an electronic package, comprising: a package substrate; a magnetic block, wherein the magnetic block passes through the package substrate; a fluidic path from an inlet to the package substrate to an outlet of the package substrate; and a conductive winding in the package substrate, wherein the conductive winding wraps around the magnetic block, and wherein the conductive winding is tubular and the fluidic path passes through the conductive winding.

Example 2: the electronic package of Example 1, wherein the magnetic block comprises three prongs that extend through the package substrate.

Example 3: the electronic package of Example 1 or Example 2, wherein the conductive winding wraps around the three prongs.

Example 4: the electronic package of Examples 1-3, wherein the conductive winding comprises a first tubular layer in a first layer of the package substrate and a second tubular layer in a second layer of the package substrate.

Example 5: the electronic package of Examples 1-4, wherein a lining is disposed over an interior surface of the conductive winding.

Example 6: the electronic package of Examples 1-5, further comprising:

pillars within the conductive winding.

Example 7: the electronic package of Examples 1-6, wherein an entire lateral length of the fluidic path is within the conductive winding.

Example 8: the electronic package of Examples 1-7, further comprising: a second magnetic block, wherein the second magnetic block passes through the package substrate; and a second conductive winding in the package substrate, wherein the second conductive winding wraps around the second magnetic block, and wherein the second conductive winding is tubular and the fluidic path passes through the second conductive winding.

Example 9: the electronic package of Example 8, wherein second conductive winding is electrically isolated from the conductive winding.

Example 10: the electronic package of Example 8 or Example 9, wherein a portion of a lateral length of the fluidic path is not bounded by the conductive winding or the second conductive winding.

Example 11: the electronic package of Example 10, further comprising: a lining around the fluidic path.

Example 12: an electronic package, comprising: a package substrate; a magnetic block, wherein the magnetic block comprises two or more prongs that extend through the package substrate; and a magnetic lid over ends of the two or more prongs, wherein the magnetic lid, the two or more prongs, and a surface of the package substrate define a cooling channel.

Example 13: the electronic package of Example 12, further comprising a tube within the cooling channel.

Example 14: the electronic package of Example 12 or Example 13, wherein there are at least three prongs to define a first cooling channel and a second cooling channel.

Example 15: the electronic package of Example 14, wherein a first tube is in the first cooling channel and a second tube is in the second cooling channel.

Example 16: the electronic package of Examples 12-15, wherein a single tube is shared by the first cooling channel and the second cooling channel.

Example 17: the electronic package of Example 16, wherein the single tube extends across a middle prong, wherein an interior dimension of the single tube over the middle prong is smaller than an interior dimension of the single tube in the first cooling channel and the second cooling channel.

Example 18: the electronic package of Example 17, wherein the single tube is pinched closed across the middle prong.

Example 19: an electronic system, comprising: a board; a package substrate electrically coupled to the board; an inductor embedded in the package substrate; a fluidic path for cooling the inductor; and a die electrically coupled to the package substrate.

Example 20: the electronic system of Example 19, wherein the inductor comprises: a magnetic block with a plurality of prongs, wherein the prongs extend through one or more layers of the package substrate; a magnetic lid over the plurality of prongs; and a conductive winding around the magnetic block.

Example 21: the electronic system of Example 20, wherein the conductive winding is tubular, and wherein the fluidic path passes through the conductive winding.

Example 22: the electronic system of Example 21 wherein the conductive winding comprises an interior lining.

Example 23: the electronic system of Example 20, wherein the fluidic path passes between the plurality of prongs.

Example 24: the electronic system of Example 23, wherein a tube is provided between the plurality of prongs.

Example 25: the electronic system of Example 24, wherein a single tube is shared between a first pair of prongs and a second pair of prongs.

What is claimed is:

1. An electronic package, comprising:

a package substrate;

a magnetic block, wherein the magnetic block passes through the package substrate, the magnetic block comprising a plurality of prongs that extend through the package substrate;

a fluidic path from an inlet to the package substrate to an outlet of the package substrate; and a conductive winding in the package substrate, wherein the conductive winding wraps around the magnetic block, and wherein the conductive winding is tubular and the fluidic path passes through the conductive winding.

2. The electronic package of claim 1, wherein the magnetic block comprises three prongs that extend through the package substrate.

3. The electronic package of claim 2, wherein the conductive winding wraps around the three prongs.

4. The electronic package of claim 1, wherein the conductive winding comprises a first tubular layer in a first layer of the package substrate and a second tubular layer in a second layer of the package substrate.

5. The electronic package of claim 1, wherein a lining is disposed over an interior surface of the conductive winding.

6. The electronic package of claim 1, further comprising: pillars within the conductive winding.

7. The electronic package of claim 1, wherein an entire lateral length of the fluidic path is within the conductive winding.

8. The electronic package of claim 1, further comprising:

a second magnetic block, wherein the second magnetic block passes through the package substrate; and a second conductive winding in the package substrate, wherein the second conductive winding wraps around the second magnetic block, and wherein the second conductive winding is tubular and the fluidic path passes through the second conductive winding.

9. The electronic package of claim 8, wherein second conductive winding is electrically isolated from the conductive winding.

10. The electronic package of claim 8, wherein a portion of a lateral length of the fluidic path is not bounded by the conductive winding or the second conductive winding.

11. The electronic package of claim 10, further comprising:

a lining around the fluidic path.

12. An electronic package, comprising:

a package substrate;

a magnetic block, wherein the magnetic block comprises two or more prongs that extend through the package substrate; and a magnetic lid over ends of the two or more prongs, wherein the magnetic lid, the two or more prongs, and a surface of the package substrate define a cooling channel.

13. The electronic package of claim 12, further comprising a tube within the cooling channel.

14. The electronic package of claim 12, wherein the two or more prongs comprise at least three prongs to define a first cooling channel and a second cooling channel.

15. The electronic package of claim 14, wherein a first tube is in the first cooling channel and a second tube is in the second cooling channel.

16. The electronic package of claim 14, wherein a single tube is shared by the first cooling channel and the second cooling channel.

17. The electronic package of claim 16, wherein the single tube extends across a middle prong, wherein an interior dimension of the single tube over the middle prong is smaller than an interior dimension of the single tube in the first cooling channel and the second cooling channel.

18. The electronic package of claim 17, wherein the single tube is pinched closed across the middle prong.

19. An electronic system, comprising:

a board;

a package substrate electrically coupled to the board;

an inductor embedded in the package substrate, wherein the inductor comprises:

a magnetic block with a plurality of prongs, wherein the plurality of prongs extend through the package substrate;

a magnetic lid over the plurality of prongs; and a conductive winding around the magnetic block;

a fluidic path for cooling the inductor; and a die electrically coupled to the package substrate.

20. The electronic system of claim 19, wherein the conductive winding is tubular, and wherein the fluidic path passes through the conductive winding.

21. The electronic system of claim 20 wherein the conductive winding comprises an interior lining.

22. The electronic system of claim 19, wherein the fluidic path passes between the plurality of prongs.

23. The electronic system of claim 22, wherein a tube is provided between the plurality of prongs.

24. The electronic system of claim 23, wherein a single tube is shared between a first pair of prongs and a second pair of prongs.

25. An electronic package, comprising:

a package substrate;

a magnetic block, wherein the magnetic block passes through the package substrate;

a fluidic path from an inlet to the package substrate to an outlet of the package substrate;

a conductive winding in the package substrate, wherein the conductive winding wraps around the magnetic block, and wherein the conductive winding is tubular and the fluidic path passes through the conductive winding;

a second magnetic block, wherein the second magnetic block passes through the package substrate; and a second conductive winding in the package substrate, wherein the second conductive winding wraps around the second magnetic block, and wherein the second conductive winding is tubular and the fluidic path passes through the second conductive winding.

26. The electronic package of claim 25, wherein second conductive winding is electrically isolated from the conductive winding.

27. The electronic package of claim 25, wherein a portion of a lateral length of the fluidic path is not bounded by the conductive winding or the second conductive winding.

28. The electronic package of claim 27, further comprising:

a lining around the fluidic path.

* * * * *